US006457077B1

United States Patent
Kelley et al.

(10) Patent No.: US 6,457,077 B1
(45) Date of Patent: Sep. 24, 2002

(54) SYSTEM FOR EXECUTING A CURRENT INFORMATION TRANSFER REQUEST EVEN WHEN CURRENT INFORMATION TRANSFER REQUEST EXCEEDS CURRENT AVAILABLE CAPACITY OF A TRANSIT BUFFER

(75) Inventors: Richard A. Kelley, Apex, NC (US); Danny Marvin Neal, Round Rock; Steven Mark Thurber, Austin, both of TX (US); Adalberto Guillermo Yanes, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/329,459

(22) Filed: Jun. 10, 1999

(51) Int. Cl.[7] .............................................. G06F 13/14
(52) U.S. Cl. ............................ 710/56; 710/100; 714/47
(58) Field of Search ......................... 710/56, 57, 100; 714/47

(56) References Cited

U.S. PATENT DOCUMENTS

| | | | | |
|---|---|---|---|---|
| 5,867,482 A | * | 2/1999 | Kobayashi | 370/252 |
| 5,867,686 A | * | 2/1999 | Conner et al. | 711/168 |
| 5,898,848 A | * | 4/1999 | Gulick | 710/128 |
| 5,974,571 A | * | 10/1999 | Riesenman et al. | 714/47 |
| 6,202,101 B1 | * | 3/2001 | Chin et al. | 710/5 |

* cited by examiner

Primary Examiner—Jeffrey Gaffin
Assistant Examiner—Abdelmoniem Elamin
(74) Attorney, Agent, or Firm—Robert V. Wilder; Mark E. McBurney

(57) ABSTRACT

A method and implementing system is provided in which system bridge circuits are enabled to execute, or over-commit to, transaction requests from system devices for information transfers which exceed the bridge circuit's current capacity to receive the requested information on its return from a designated target device such as system memory or another system device. The transaction request is moved along the data path to the designated target device and the requested information is returned, in an example, to the requesting device. By the time the requested information is returned to the requesting bridge circuit, a number of the holding buffers usually have been freed-up and are available to accept and pass the information to the requesting device. In an illustrated embodiment, the amount of over-commitment is programmable and the amount of over-commitment to transaction requests may be automatically adjusted to optimize the information transfer in accordance with the particular system demands and current data transfer traffic levels.

28 Claims, 5 Drawing Sheets

SYSTEM FOR EXECUTING A CURRENT INFORMATION TRANSFER REQUEST EVEN WHEN CURRENT INFORMATION TRANSFER REQUEST EXCEEDS CURRENT AVAILABLE CAPACITY OF A TRANSIT BUFFER

FIELD OF THE INVENTION

The present invention relates generally to information processing systems and more particularly to an improved information transfer methodology in a computer related environment.

BACKGROUND OF THE INVENTION

As computer systems and networked computer systems proliferate, and become integrated into more and more information processing systems which are vital to businesses and industries, there is an increasing need for faster information processing and increased data handling capacity. Even with the relatively rapid state-of-the-art advances in processor technology, and the resulting increased processor speeds, a need still exists for faster processors and increased system speeds and bandwidths. As new applications for computers are implemented, new programs are developed and those programs are enriched with new capabilities almost on a daily basis. While such rapid development is highly desirable, there is a capability cost in terms of system speed and bandwidth.

As used herein, the term "bandwidth" is used generally to refer to the amount of information that can be transferred in a given period of time. In transferring information between devices in a computer system, information is frequently temporarily stored in "holding" buffers along the path of the information transfer. Such buffers include bridge buffers which are generally located in bridge circuits connecting devices or busses between which the information is to be transferred. In one example, peripheral component interconnect or "PCI" system bridge circuit buffers are assigned to PCI devices, which are installed in PCI "slots" and coupled to an associated PCI bus. Complex computer systems may include many bridge circuits connected between individual PCI busses or connecting a PCI bus to a system bus. In a PCI system, any of the computer system enhancement devices or adapters are generally included on one or more circuit boards which are mounted or inserted is into PCI "slots", i.e. into board connector terminals mounted on a system motherboard.

In the past, the "holding" or "in transit" buffers were usually available for any device to utilize, and in some cases, depending on the arbiter, some devices could be temporarily deprived of available buffers because each time a device is granted the bus, the device could find that the "return" buffers are full, in which case the requested transaction is halted until such a time as an appropriate number of transfer buffers are emptied and become available for use in temporarily storing data for another transaction. In systems which include extended bridge circuit architectures, transaction requests which originate from devices on lower order bridges must wait for available buffers at the lower level bridge circuits before such requests can even be moved along the system bridge architecture to the next bridge buffers on the path to system memory or to other PCI or other devices in the system. This process has an inherent latency while waiting for available bridge holding buffers to be freed-up from earlier transactions. Even after a buffer is indicated as being available for use in a new transaction, there can be latency or delay involved in notifying the waiting transactions that the buffers are free and available to be used in passing the transaction request up to the next "higher" bridge on the system data path due to the other current bus activity.

Thus there is a need for an improved methodology and implementing system which enables a more advantageous use of buffer availability in transferring information between devices connected within an information processing system.

SUMMARY OF THE INVENTION

A method and implementing system is provided in which system bridge circuits are enabled to execute, or over-commit, transaction requests from system devices for information transfers which exceed the bridge circuit's current capacity to receive the requested information on its return from a designated target device such as system memory or another system device. The transaction request is moved along the data path to the designated target device and the requested information is returned, in an exemplary embodiment, to the requesting device. The over-commitment is controlled so that, in a well-tuned system, buffer space frees up just in time to accept the read completion data as that data is being returned to the requesting device. In an illustrated embodiment, the amount of over-commitment is programmable and the amount of over-commitment to transaction requests may be automatically adjusted to optimize the information transfer in accordance with the particular system demands and current data transfer traffic levels. The data transfer methodology is illustrated in a PCI system but may be used in many bus protocols and is applicable to information transfers to and from system memory as well as between peer devices.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION

The various methods discussed herein may be implemented within a typical computer system which may include a server, workstation, or personal computer. In general, an implementing computer system may include a plurality of processors in a multi-bus system within a network of similar systems. However, since the workstation or computer system in which the present invention may be implemented is generally known in the art and composed of electronic components and circuits which are also generally known to those skilled in the art, circuit details beyond those shown are not specified to any greater extent than that considered necessary as illustrated, for the understanding and appreciation of the underlying concepts of the present invention and in order not to obfuscate or distract from the teachings of the present invention.

Figure 1:
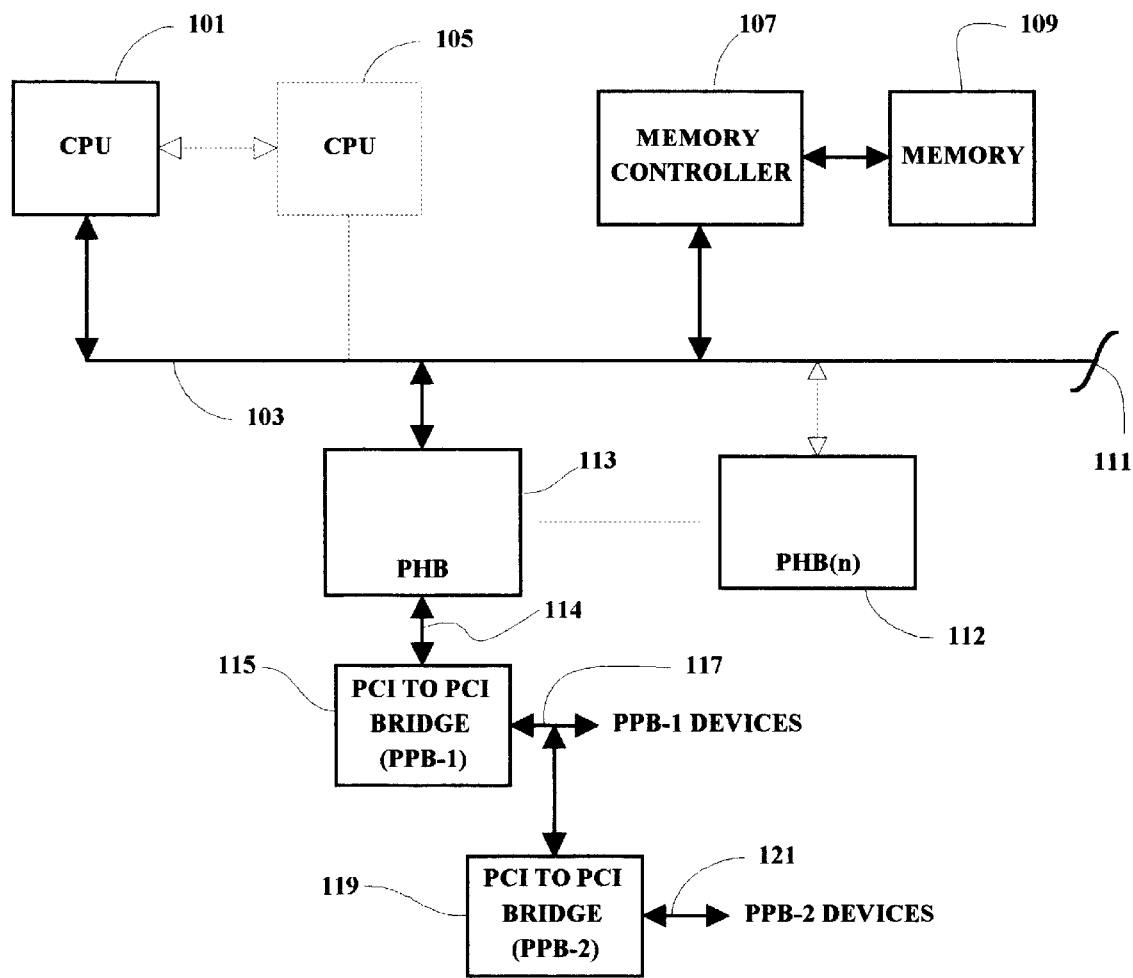
FIG. 1 is a diagram of an exemplary computer system in which the present invention may be implemented.

As hereinafter explained in detail, the disclosed methodology is effective in connection with an exemplary PCI bus system which utilizes effective posted memory write transactions and delayed read and delayed write transactions. This approach is also effective with high performance future extensions of the PCI Local Bus Specification ("PCI-X"), which utilizes posted memory write transactions and split read and split write transactions. PCI ordering rules require that read transactions "push" previous write transactions ahead of them. In the case of delayed transactions for PCI, the master that initiates the request must get back on the bus and repeat the original request again and again until the transaction completes. Split transactions are different from delayed transactions in that the split request receives a split response on the bus instead of a Retry. The master does not need to continue repeating the request. The target of that request will obtain the bus later and will act at that time as a master on the bus and provide split completion data or message back to the original master. The original master will then act as a target to receive the completion data or message. With reference to the disclosed embodiment, it is noted that while a PCI computer system is illustrated, the present invention is also applicable to other information processing systems in which data is transferred between a plurality of "holding" or "in-transit" storage locations in an extended processing or communication system. In the exemplary PCI system illustrated, each bus is connected to a next higher level bus in the system through a PCI bridge circuit. Each PCI bus in a system may have a number of slots. The actual number of slots allowable for adapters connected to the PCI bus is dependent on the intended operating frequency and mode of operation (PCI or PCIX mode). In extensive computer systems, PCI busses are connected to other PCI busses through PCI-to-PCI bridge circuits which are, in turn, connected to one or more of the slots on higher level PCI busses. Each bridge circuit in the system includes a number of buffers which are assigned to corresponding ones of the devices in the PCI slots, for use in temporarily storing information transferred to and from the corresponding assigned devices installed in the PCI slots of the system. For example, in FIG. 1, an exemplary PCI system includes one or more CPUs 101, 105, which are connected to a system bus 103. A memory controller 107 and memory unit 109 are also connected to the system bus 103. The bus 103 is extended 111 for further system connections to other system devices and networks which are known in the art but are not specifically illustrated in order not to obfuscate the drawings and distract from the disclosure of the present invention.

The system bus 103 is also coupled through a PCI Host Bridge (PHB) circuit 113 to a first PCI bus 114. The system may include additional PCI-to-Host bridge circuits as indicated by the PHB(n) circuit 112. The bus 114 is coupled to a first PCI-to-PCI Bridge circuit,(PPB) 115 which is connected to a second PCI bus 117. The second PCI bus is arranged to be selectively coupled to a first group of PCI devices (PPB-1 Devices) as shown. The second PCI bus 117 is also arranged to be connected to a second PCI-to-PCI bridge circuit (PPB-2) 119 which is arranged to be selectively connected to one or more of a second group of PCI devices (PPB-2 Devices) through a third PCI bus 121 in the present example. It is noted that only two cascaded PCI-to-PCI bridge circuits are illustrated in the present example although the invention also applies to other configurations which may include additional PCI bridge circuits and host bridge circuits.

Figure 2:
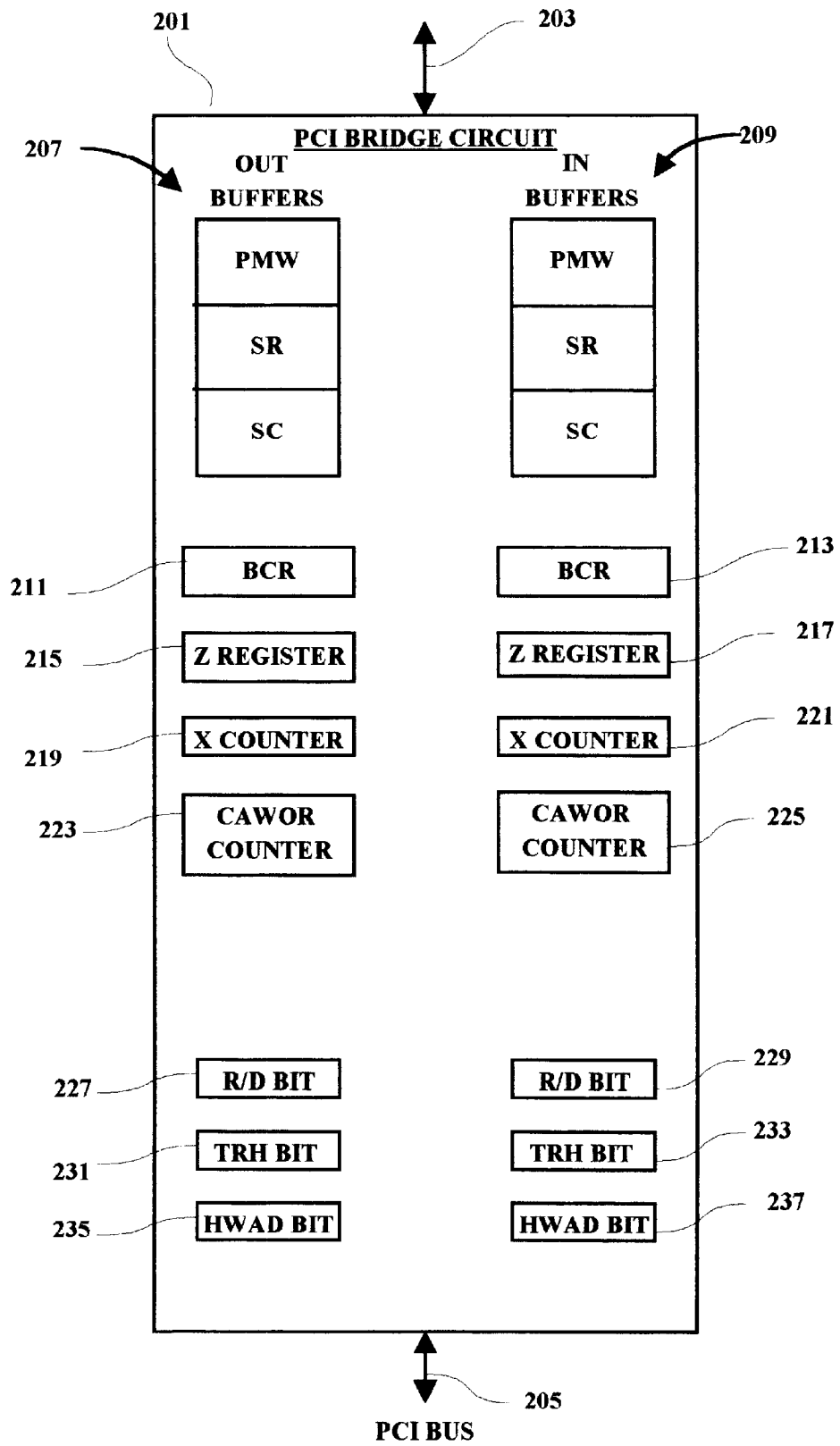
FIG. 2 is a schematic diagram illustrating several key components utilized in an implementation of the present invention.

In FIG. 2, there is shown an exemplary PPB circuit 201 including several of the key components utilized in the illustrated implementation of the present invention. The PPB 201 includes connection means 203 for connecting the PPB to higher level bridge circuits and also for connecting the PPB 201 to other peer PCI devices through other bridge circuits. The PPB 201 also includes connection means 205 for connecting the PPB to lower level bridges and other peer PCI devices. As illustrated, the PPB circuit 201 includes an "OUT" set of buffers 207 and an "IN" set of buffers 209. Buffers 207 and 209 act as transit buffers used store information during an information transfer transaction. The "OUT" buffers are used to temporarily store data being transferred "out" from system memory 109 for example, to one of the PCI devices "below" the PPB 201. Similarly, the "In" buffers 209 are used in storing information being transferred from one of the PCI devices "below" the PPB 201 "In" to system memory 109 or to another device "above" the PPB 201. In an exemplary operation, when an information transfer request is sent from a PCI device below the PCB 201 through connector 205, the PPB 201 will check the out buffers 207 to determine if there is sufficient unused storage space in the buffers to hold the requested information on its return trip from system memory for example back to the requesting PCI device. As is hereinafter explained in more detail, even if the out buffers are full of information at this time, the present invention allows the PPB to "over-commit" to the request for information and pass the request to the next higher level (for example the next higher PPB) toward the designated target device (such as system memory or another PCI device). The present invention thereby takes advantage of the fact that by the time the requested information is being returned to the requesting device, a number of out buffers 207 will usually have been freed-up and will be available to accept the returning information. This methodology of buffer over-commitment allows the system to significantly reduce information transfer latency delays which have heretofore been unavoidable.

The PPB 201 also includes two read-only Buffer Capacity Registers (BCRs) 211 and 213. The BCRs 211 and 213 are used to indicate total buffer capacity implemented in a particular bridge in each direction for storing currently requested information when it is being returned to a requesting device. It is noted that the buffers 207 and 209 can be symmetrical and operate to store returning information in either direction. Thus, in addition to the information flow described above, information requests from devices above the PPB 201 to devices below PPB 201 are channeled through the "Out" buffers 207, and the PPB 201 will check for buffer space in the "In" buffers 209 before passing the request. Typically, the "Out" buffers 207 and the "In" buffers 209 would be partitioned into separate sections for Posted Memory Write (PMW), Split Requests (SR) and Split Completions (SC), respectively, as illustrated in FIG. 2. The BCR registers 211 and 213 indicate the capacity of the Split Completion sections. Split Read Completions and Split Write Completions could be stored in the same buffer section or could each have their own separate section of buffers. If Read Completions are stored in their own separate set of buffers, then the BCR registers 211 and 213 represent only the total capacity of buffers implemented to store Split Read Completion Data.

The PPB 201 also shows a pair of "Allowed Over-commitment (Z) registers" 215 and 217 for storing an "allowed" over-commitment factor representative of how much the PPB may over-commit to transaction requests. As hereinafter explained, The "Z" factor is initially set at a designated level, and may thereafter be adjusted in order to optimize or "fine-tune" the over-commitment level to suit the information transfer dynamics of the particular system. The value of "Z" could be initialized to: (a) FFh (initially a flood mode and allow it to automatically adjust the over-commitment value downwardly); or (b) a value equal to the buffer capacity register BCR (initially a "no over-commit" mode and allow it to automatically adjust the allowed over-commitment upwardly); or (c) to some predetermined assumed optimum setting greater than the BCR to allow some over-commitment and to allow an automatic adjustment of the allowed over-commitment upwardly or downwardly as appropriate. The end result will be the same, with the allowed over-commitment being adjusted upwardly or downwardly as bus traffic changes over time. The preferred embodiment for the initialized starting point for Z is used herein as case (b) with the initial Z value equal to the BCR value.

A pair of "X" or transaction counters 219 and 221 are also included in the PPB 201. The X counters 219 and 221 keep track of the outstanding transactions (or commitments) at any point in time. Also included in the exemplary PPB circuit 201 are a pair of CAWOR ("Completion Accepted With Out Reset") counters 223 and 225 which, in the example, are count-down counters which keep track of split transaction completions. In the example, this is an 8-bit counter that can be set to any programmable START value and counts down to "0". A Reset of this CAWOR counter resets to the programmed START value. Also included in the PPB 201 are corresponding pairs of condition bits including R/D (Retry/Disconnect) bits 227 and 229, TRH (Transaction Request Held-up) bits 231 and 233 and HWAD (Hardware Adjustment Disable) bits 235 and 237. The TRH and R/D bits are useful in allowing either a hardware or an alternate software means to be implemented in determining the value of the "Z" factor. The hardware adjustment disable bits allows a selection of either a hardware or software method to test the two bits to control the amount of the allowed over-commitment up or down. The condition bits may be implemented in any of many known methods and are used for references during operation sequences for the PPB 201 as is hereinafter explained in more detail. In the illustrated example, the R/D, TRH and X default values are set to "0" and system software sets the lower six bits of the CAWOR counter to all "1s" and initially, "Z" is set to the BCR value.

Figure 3:
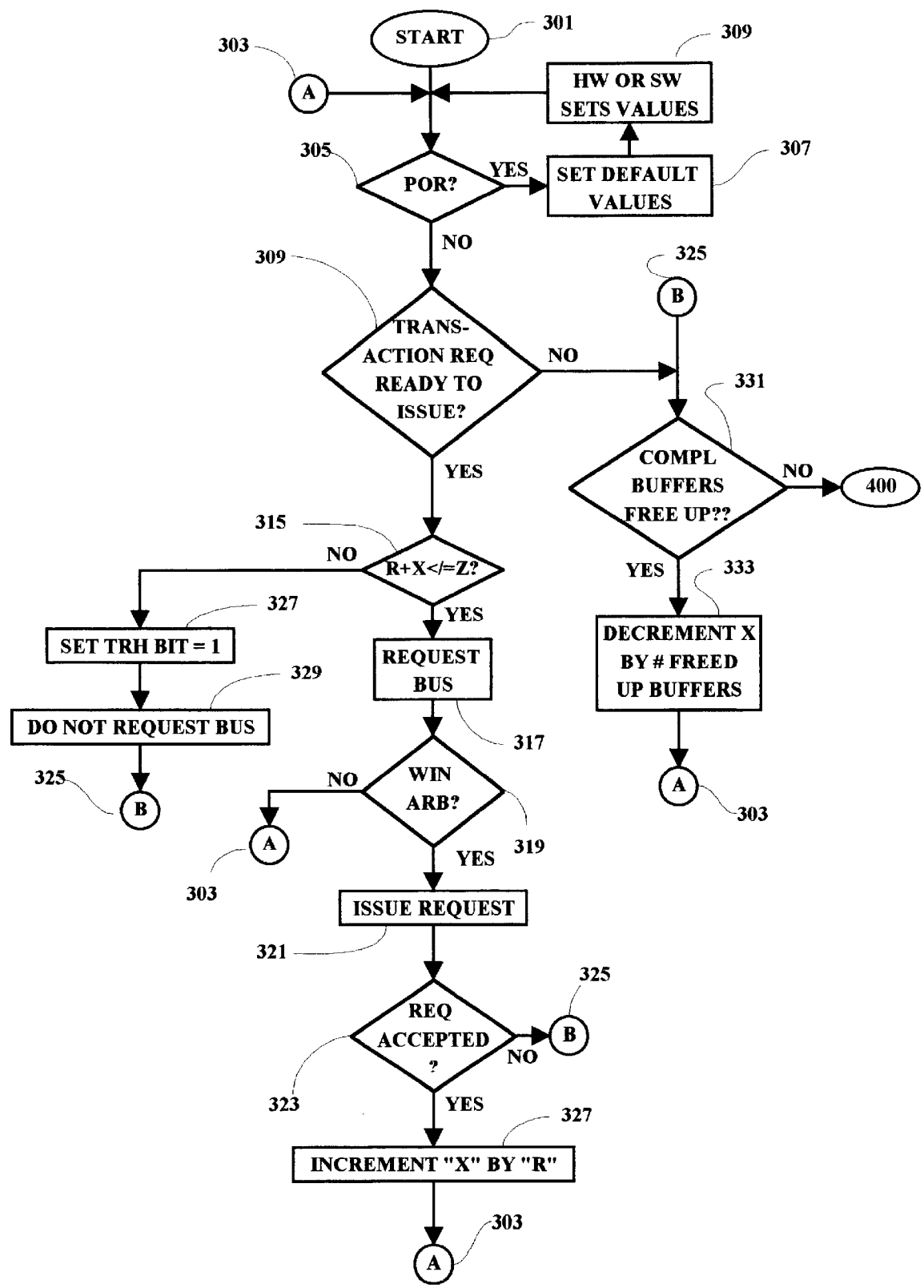
FIG. 3 is a flow chart illustrating an exemplary operational sequence of the methodology of the present invention.

In an exemplary operation as illustrated in FIG. 3, when the system is initialized 301, if there is a power-on reset (POR) 305, then the above noted default values are set 307 and the default values may be changed or updated by a user through a hardware or software option 309. After initialization, a check is made to determine if a data transfer transaction request is ready to issue 309 from the PPB circuit 201. If so, a check is made to determine whether the sum of the size of the next transaction request "R" and the outstanding transactions "X" are less than or equal to the current allowed over-commitment value "Z". If that condition is true, the bus between the requesting device and the PPB circuit is requested 317 by the requesting device, and an arbiter in the next higher bridge will determine if the requesting device is granted the PCI bus among other devices which may be requesting the bus at the same time. If the requesting device wins the arbitration 319, the request is issued 321 on the bus. If the request is accepted, then the outstanding transaction counter "X" is incremented by the current request "R" 327 and the process returns to the start point "A" 303 to begin another cycle. If the requesting device does not win the arbitration 319, the process returns to the start point A 303 without issuing a request. If it is determined that the current request R when added to the outstanding requests X is greater than the value of Z 315, then that means that the over-commitment level will be exceeded if the current request is issued and the current request must be held-up. Thus, if R+X is greater than Z 315, the TRH (transaction held-up) bit is set to "1" 327, and the bus is not requested 329. The process continues by moving to point B 325 to further determine if any completion buffers have freed-up.

If the allowed over-commitment level Z would be exceeded by the current request 315, or if a request is not accepted 323, or if a transaction request is not ready to issue 309, then a check is made to determine if any completion buffers have freed-up 331. If any of the completion buffers have not freed-up 331, then the process continues by moving to point 400 which is illustrated on FIG. 4. If, however, any completion buffers have freed-up 331, then the outstanding transaction register X is decremented by the number of freed-up buffers 333 and the process returns to the start point A 303 to recycle. On the recycle or next pass, if the number of freed-up buffers is greater than the number required for the next request and the Z value is not exceeded 315, the process will continue by requesting the bus 317 as hereinbefore explained.

Figure 4:
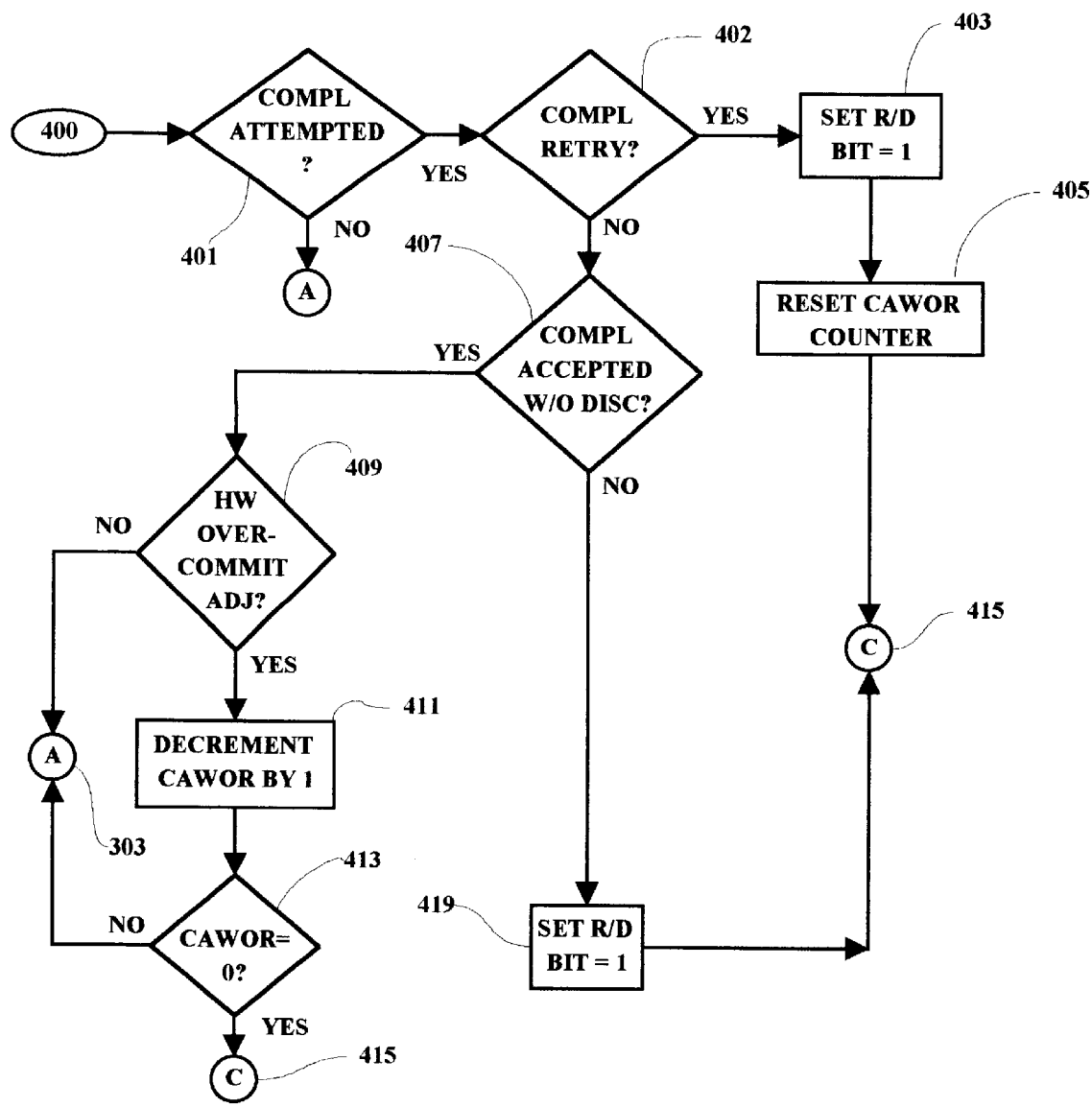
FIG. 4 is a continuation of the flow cart shown in FIG. 3.

In FIG. 4, when completion buffers have not freed-up, a check is made to determine if a completion was attempted 401. If no completion was attempted 401 then the process returns to the start point A. If, however, a completion was attempted by a requesting device 401, then a check is made to determine if there was a completion Retry 402. If there was a completion Retry 402, then that means that the completion was not accepted by the PPB 201. The R/D (Reset/Disconnect) bit is then set to "1" 403, and the appropriate CAWOR (Completion Accepted Without Retry) counter 223/225 is reset 405 and the process moves to point "C" 415 which is continued on FIG. 5. If there was no completion Retry 402, then that means that the completion was accepted by the PPB 201 and a check is made to determine if a completion was accepted without a disconnect 407. If not, then the R/D bit is set to "1" 419, and the process moves to point "C" 415, which is continued on FIG. 5. If, however, a completion was accepted without a disconnect 407, that means that the full completion transaction was accepted completely during the same bus transfer (all of the completion data that was requested to be transferred was accepted). In that case, a check is made to determine if a hardware over-commitment adjustment 409 is enabled. If not, then the process returns to the start point A for a recycle. However, if the hardware over-commitment is enabled 409, then the appropriate CAWOR counter 223/225 is decremented 411 and a check is made to determine if the CAWOR count is equal to zero 413 in the present example. (If the CAWOR counter is implemented with an up-counter, then the check will determine if a predetermined up-count has been reached.) If the CAWOR counter has not been counted down to zero, the process returns to the start point A 303. However, if the CAWOR counter has been counted down to zero 413 then the process moves to point C 415 which is continued on FIG. 5.

Figure 5:
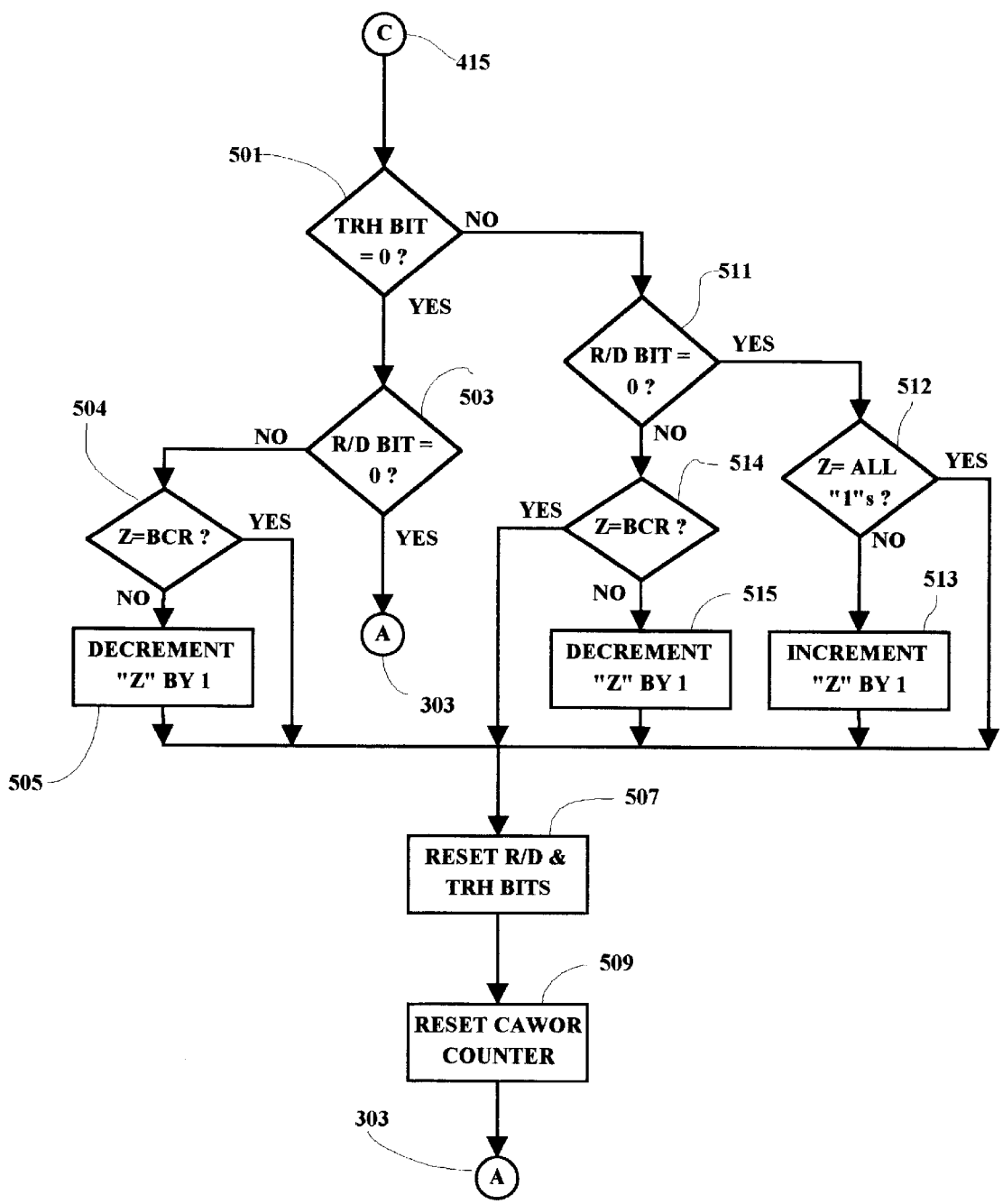
FIG. 5 is a flow chart illustrating an exemplary method for adjusting the buffer over-commitment level for the bridge buffers.

In FIG. 5, the TRH and R/D bits are tested to determine whether the value of "Z" should be left the same or adjusted upwardly or downwardly to adjust the level of over-commitment. As illustrated, from point C 415, a check is made to determine if the TRH bit is equal to zero 501, i.e.

was a transaction request held-up (for example, by step 315 in FIG. 3). If a transaction request was held-up 501, then a check is made to determine if there was a reset or disconnect. If the R/D bit is equal to "0" 511, then that means that there was no reset or disconnect on the last transaction. A check is then made 512 to determine if the value of "Z" is equal to "ALL 1's", i.e. all bits at logic "1" level. If true, then Z cannot be incremented any further and the process bypasses the next step 513. Otherwise, the value of Z is increased by a predetermined amount 513, such as by "one" in the example. In that case, it was determined that the system is holding up requests but buffers are being freed-up in time to accept returning data. Accordingly, the allowed over-commitment value Z is increased to allow even more over-commitment to transfer requests vis-a-vis the number of outstanding requests beyond the capacity BCR of the return buffers. If the R/D bit is not equal to "0" 511, that means that there was a Retry or Disconnect, and the PPB buffers were not able to accept data returning to requesting devices. A check is then made 514 to determine if Z is equal to the value of BCR. If true, then that means that Z cannot be decreased any further and the process bypasses the next step 515. Otherwise, the over-commitment Z value is decremented by "one" 515.

If the TRH bit is equal to "0" 501, i.e. if the transaction request was not held-up by the PPB 201, then a check is made to determine if the R/D bit is equal to "0" 503. If the R/D bit is equal to "0" that means that there was no reset or disconnect and the process returns to the start point A 303. If the R/D bit is not equal to "0", then that means that there was a reset or disconnect and that the PPB buffers could not accept the returning data. A check is then made 504 to determine if Z is equal to the value of BCR. If true, then that means that Z cannot be decreased any further and the process by passes the next step 505. Otherwise, the over-commitment value Z was too high and is decremented by one 505 to alleviate the data back-up. In all cases, after the value of "Z" has been adjusted in accordance with the methodology illustrated in FIG. 5, the R/D and TRH bits are reset 507 along with the CAWOR counter 509 and the process returns to the start point A 303 for another cycle. The adjustment of the over-commitment value Z in accordance with the methodology disclosed and illustrated herein, may be readily accomplished with either a hardware or a software implementation.

Thus, there has been disclosed a method and implementing system in which system bridge circuits are enabled to execute, or over-commit to, transaction requests from system devices for information transfers which exceed the bridge circuit's current capacity to receive the requested information on its return from a designated target device such as system memory or another system device. The transaction request is moved along the data path to the designated target device and the requested information is returned, in an exemplary embodiment, to the requesting device. The over-commitment is controlled so that, in a well-tuned system, buffer space usually frees up just in time to accept the read completion data as that data is being returned to the requesting device. In an illustrated embodiment, the amount of over-commitment is programmable and the amount of over-commitment to transaction requests may be automatically adjusted to optimize the information transfer in accordance with the particular system demands and current data transfer traffic levels. The data transfer methodology is illustrated in a PCI system but may be used in many bus protocols and is applicable to information transfers to and from system memory as well as between peer devices.

The method and apparatus of the present invention has been described in connection with a preferred embodiment as disclosed herein. The disclosed methodology may be implemented in a wide range of sequences to accomplish the desired results as herein illustrated. Although an embodiment of the present invention has been shown and described in detail herein, along with certain variants thereof, many other varied embodiments that incorporate the teachings of the invention may be easily constructed by those skilled in the art, and even included or integrated into a processor or CPU or other system integrated circuit or chip. The disclosed methodology may also be implemented solely or partly in program code stored on a disk or diskette (portable or fixed), or other memory device, from which it may be executed to achieve the beneficial results as described herein. Accordingly, the present invention is not intended to be limited to the specific example set forth herein, but on the contrary, it is intended to cover such alternatives, modifications, and equivalents, as can be reasonably included within the spirit and scope of the invention.

What is claimed is:

1. A method for processing information transfer requests from a first device to a second device and returning completion information from said second device through a transit buffer in a bridge device to said first device, said method comprising:

receiving a current information transfer request by said bridge device from said first device;

determining transit storage capacity in said transit buffer and needed storage capacity needed to store completion information from previous outstanding information transfer requests; and executing said current information transfer request by said bridge device, said current information transfer request plus said completion information from said previous outstanding information transfer requests being for an amount of information exceeding said transit storage capacity.

2. The method as set forth in claim 1 wherein completion information from said current information transfer request plus completion information from said previous outstanding information transfer requests is for an amount of information exceeding said transit storage capacity by less than a designated amount.

3. The method as set forth in claim 2 wherein said designated amount is selectively adjustable.

4. The method as set forth in claim 3 wherein said designated amount is determined in relation to a number of information transfer completions successfully executed prior to a current information transfer request.

5. The method as set forth in claim 4 wherein said designated amount is increased when said number of successfully executed prior information transfer completions is at least one.

6. The method as set forth in claim 4 wherein said designated amount is decreased when at least one prior information transfer was not completely accepted by said bridge device.

7. The method as set forth in claim 4 wherein said designated amount is increased when said number of successfully executed prior information transfer completions is at least one, said designated amount being decreased when at least one prior information transfer was not completely returned to said second device.

8. The method as set forth in claim 1 wherein said bridge device is a PCI bridge circuit connected to a first PCI bus, and said first device is a first PCI device coupled to said PCI bus.

9. The method as set forth in claim 8 wherein said second device is a memory unit coupled to said PCI bridge circuit, said information transfer request being sent from said first PCI device to said memory unit.

10. The method as set forth in claim 9 wherein said memory unit is a system memory.

11. The method as set forth in claim 8 wherein said second devise is a second PCI device.

12. The method as set forth in claim 11 wherein said second PCI device is coupled to said first PCI bus.

13. The method as set forth in claim 12 wherein said second PCI device is coupled to a second PCI bus.

14. The method as set forth in claim 8 wherein said transit buffer is located within said PCI bridge circuit.

15. The method as set forth in claim 1 wherein said information transfer request is for an information transfer in a first direction, said bridge device further including a second transit buffer, said second transit buffer being selectively operable for executing information transfer requests for information transfers in a second direction.

16. An information processing system comprising:
a processing device;
a system bus connected to said processing device;
a PCI host bridge coupled to said system bus;
a PCI bridge coupled to said PCI host bridge;
a PCI bus connected to said PCI bridge; and
a PCI device connected to said PCI bus, said PCI bridge including a transit buffer for storing completion information returned to said PCI bridge in response to a request for information transfer received from said PCI device, said PCI bridge being selectively operable for:
receiving a current information transfer request from said PCI device for a transfer of information to said PCI device;
determining transit storage capacity in said transit buffer and needed storage capacity needed to store completion information from previous outstanding information transfer requests; and
executing said current information transfer request by said bridge device, said current information transfer request plus said completion information from said previous outstanding information transfer requests being for an amount of information exceeding said transit storage capacity.

17. A bridge circuit arranged in an information processing system for managing information transfer requests from a first side of said bridge circuit to a second side of said bridge circuit, said bridge circuit comprising:
means for receiving information transfer requests from a requesting device connected to said bridge circuit;
a transit buffer for temporarily storing completion information being returned to said requesting device through said transit buffer;
means for determining transit storage capacity in said transit buffer; and
execution means for executing an information transfer request from said requesting device, said execution means being selectively operable for executing an information transfer request for an amount of information which, when added to information requested by previous transfer requests, exceeds said transit storage capacity of said transit buffer.

18. The bridge circuit as set forth in claim 17 wherein said information requested by said current transfer request plus information requested by previous outstanding transfer requests is for a total amount of information which exceeds said transit storage capacity by less than a designated amount.

19. The bridge circuit as set forth in claim 18 wherein said designated amount is determined in relation to a number of information transfer completions successfully executed prior to a current information transfer request.

20. The bridge circuit as set forth in claim 19 and further including a counter means for counting a number of successfully executed prior information transfer completions, and means for increasing said designated amount when said number of successfully executed prior information transfer completions matches a predetermined number.

21. The bridge circuit as set forth in claim 20 wherein said number of successfully executed prior information transfer completions is at least one.

22. The bridge circuit as set forth in claim 21 wherein said designated amount is decreased when at least one prior information transfer completions was not successfully executed.

23. The bridge circuit as set forth in claim 22 and further including a first register means for storing a number representative of said transit storage capacity.

24. The bridge circuit as set forth in claim 23 and further including a second register means for storing a number representative of said designated amount.

25. The bridge circuit as set forth in claim 24 and further including a third register means for storing a number representative of a number of outstanding requests for information transfers through said transit buffer.

26. The bridge circuit as set forth in claim 25 and further including a fourth register means for storing a Retry bit representative of a generation of a Retry signal, said Retry bit being used in determining whether an information transfer request resulted in a successful transfer of information.

27. The bridge circuit as set forth in claim 26 and further including a fifth register means for storing a Disconnect bit representative of a generation of a Disconnect occurrence, said Disconnect bit being used in determining whether an information transfer request resulted in a successful transfer of information.

28. The bridge circuit as set forth in claim 27 and further including a sixth register means for storing a transaction hold bit representative of a generation of a transaction being held-up, said transaction hold bit being used in determining whether an information transfer request resulted in a successful transfer of information.

* * * * *